United States Patent

Hurt

[11] 3,713,501
[45] Jan. 30, 1973

[54] POWER HAND TRUCK
[76] Inventor: Robert H. Hurt, 421 North State, Kent, Wash. 98031
[22] Filed: Nov. 6, 1970
[21] Appl. No.: 87,561

[52] U.S. Cl. .............................. 180/9.22, 280/5.22
[51] Int. Cl. ............................................. B60p 9/00
[58] Field of Search ....... 180/8, 19 R, 9.22; 280/5.22; 305/52

[56] References Cited

UNITED STATES PATENTS

| | | | |
|---|---|---|---|
| 2,751,259 | 6/1956 | Bonmartini | 305/52 |
| 3,330,370 | 7/1967 | Morton | 180/9.22 |
| 3,156,315 | 11/1964 | Hawgood | 180/19 R X |
| 2,740,484 | 4/1956 | Montana | 280/5.22 X |

*Primary Examiner*—Kenneth H. Betts
*Attorney*—Clarence A. O'Brien and Harvey B. Jacobson

[57] ABSTRACT

A hand truck frame mounts an endless chain belt having a perpendicularly extending bulb-like member connected thereto. As the belt rotates, the bulb-like member engages a step and causes the hand truck to be elevated to a vertically succeeding step. A manually operated clutch selectively links the chain belt with the wheel axle of the hand truck thereby powering the wheels, which is desirable on flat ground.

5 Claims, 7 Drawing Figures

PATENTED JAN 30 1973

Robert H. Hurt
INVENTOR.

BY *Clarence A. O'Brien*
*and Harvey B. Jacobson*
Attorneys

Robert H. Hurt
INVENTOR

BY Clarence A. O'Brien
and Harvey B. Jacobson
Attorneys

POWER HAND TRUCK

FIELD OF THE INVENTION

The present invention relates to electrically driven load carriers and more particularly to a powered hand truck capable of lifting itself along a flight of steps.

THE PRIOR ART

During the present time, when it becomes necessary to elevate a hand truck up a flight of steps, a great deal of manual force must be exerted by the user in order to accomplish the chore. In cases where the load is excessive, two men may be called upon to lift the heavy load up the steps. Certain prior art designs have attempted to achieve powered lifting of a hand truck up steps. Although the previously conceived units offer theoretical advantages over a plain hand truck, it has been found that the machinery required adds a great deal of weight to the hand truck, and even if the hand truck is powered during its elevation up a flight of steps, the extra weight of the machinery makes it quite inconvenient when the hand truck is pushed across level ground. Further, although many prior art designs have attempted to achieve powered lifting of a hand truck, they have failed to recognize the capability of having the driving motor also power the wheels of the hand truck during level ground use.

SUMMARY OF THE INVENTION

The present invention is directed to an improvement over previous powered hand trucks. The structure of the present invention is rather simple thereby resulting in an extremely reliable unit which is relatively inexpensive to fabricate. In the first embodiment of the invention, an electric drill is employed as a prime mover, In a second embodiment of the invention, a permanently mounted electric motor is connected to the hand truck frame.

In the present embodiment, an endless belt which is longitudinally oriented with respect to the frame of the hand truck mounts a bulbous member which engages the steps in a flight of steps and as the belt moves, the bulbous member causes lifting of the hand truck onto succeeding steps in the flight. By rotatably connecting the bulbous member to the driving belt, the hand truck may be laterally moved on the step tread to effect centering of the hand truck. Further, a manually operated clutch selectively links the driving belt with the axle of the hand truck thereby enabling the hand truck user to power the wheels during passage over level ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

DESCRIPTION OF THE INVENTION

Figure 1:
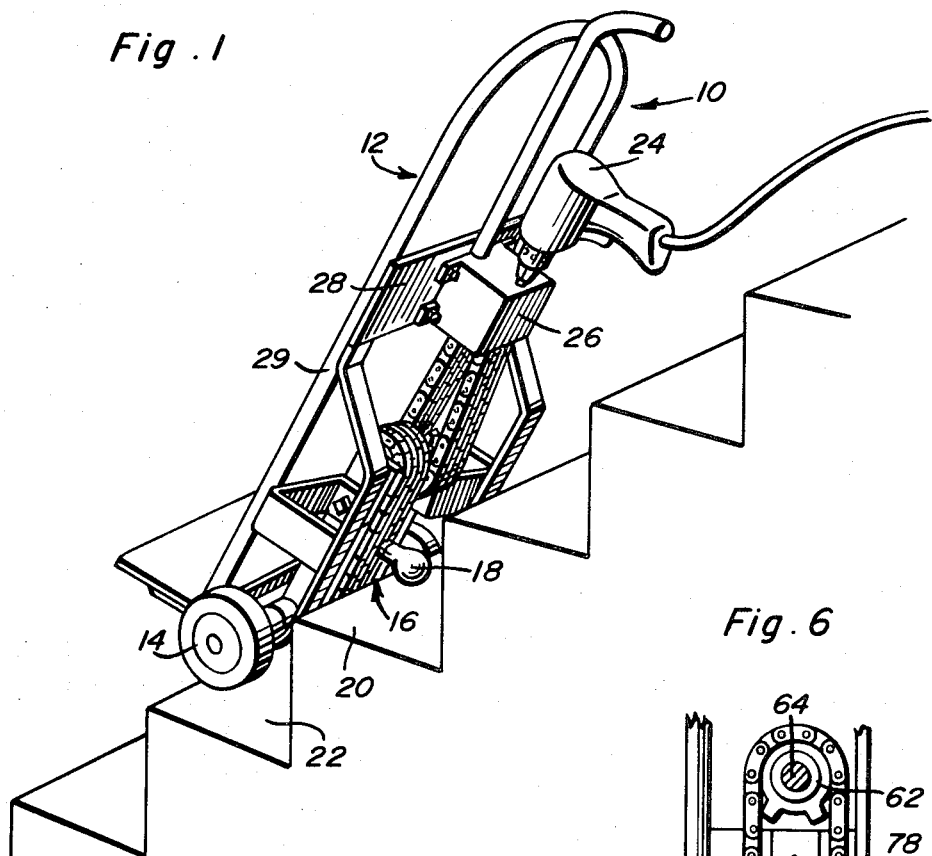
FIG. 1 is a perspective view illustrating the disposition of the hand truck, equipped with the components of the present invention, as operating on a flight of steps.

Reference numeral 10 generally indicates a load carrier or powered hand truck constituting the present invention. The hand truck includes the usual frame 12 having wheels 14 at the lower end thereof.

A transmission mechanism or conveyor 16 has a longitudinal bulbous member 18 mounted thereon, and arranged extending perpendicularly away from frame 12 and mechanism 16. As the transmission mechanism 16 operates, the bulbous member is vertically conveyed so as to cause its periodic engagement with the tread of a step 20. After engagement, the bulbous member 18 bears down on the tread of the step and causes the hand truck to be lifted upwardly to a vertical succeeding step. At the time the bulbous member 18 engages the step 20, the wheels 14 rest upon the tread of a lower step 22. However, after completion of a lifting cycle, the wheels will leave the step 22 and will rest on step 20.

Figure 7:
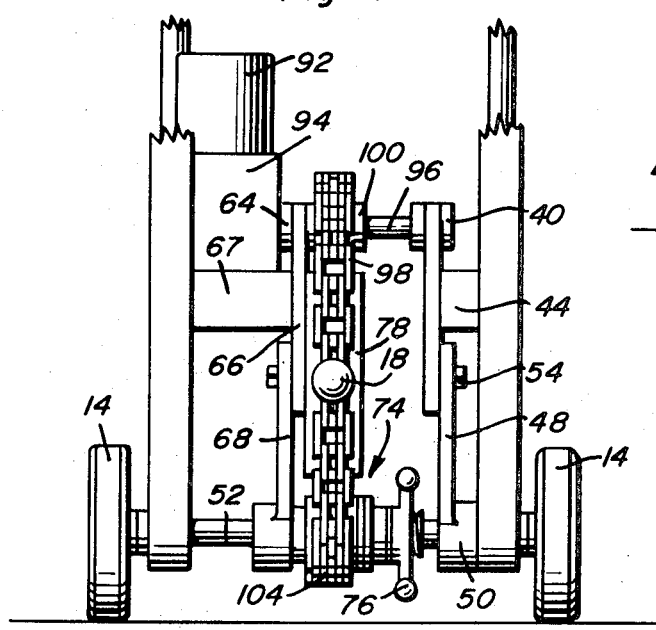
FIG. 7 is a rear elevational view of the second embodiment of the present invention.

An electric motor must be employed to operate the transmission mechanism 16. In the first form of the invention, an electric drill 24 is coupled to a gear box 26, the electric drill being selectively operated to drive the gear box 26 which in turn drives the transmission mechanism 16. In the second embodiment of the present invention, as illustrated in FIG. 7, rather than utilizing an electric drill 24, a permanently mounted electric motor, as discussed hereinafter, supplies driving power.

Figure 3:
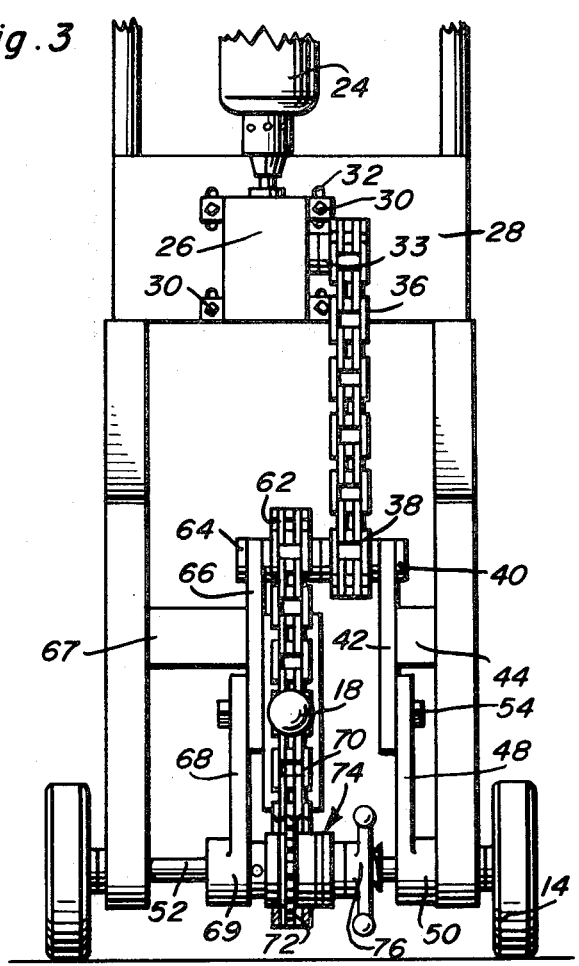
FIG. 3 is a rear elevational view of the structure shown in FIG. 2.

As indicated in FIG. 1, a brace member 28 is transversely connected between the leg sections 29 of the frame. The gear box 26 is adjustably mounted to the brace 28. As shown in FIG. 3, the gear box 26 has tabs 30 extending therefrom into which bolt fasteners are received. Elongated slots 32 are formed in the brace 28 and upon loosening of the fasteners, the gear box 26 may be vertically adjusted relative to the brace 28.

Figure 2:
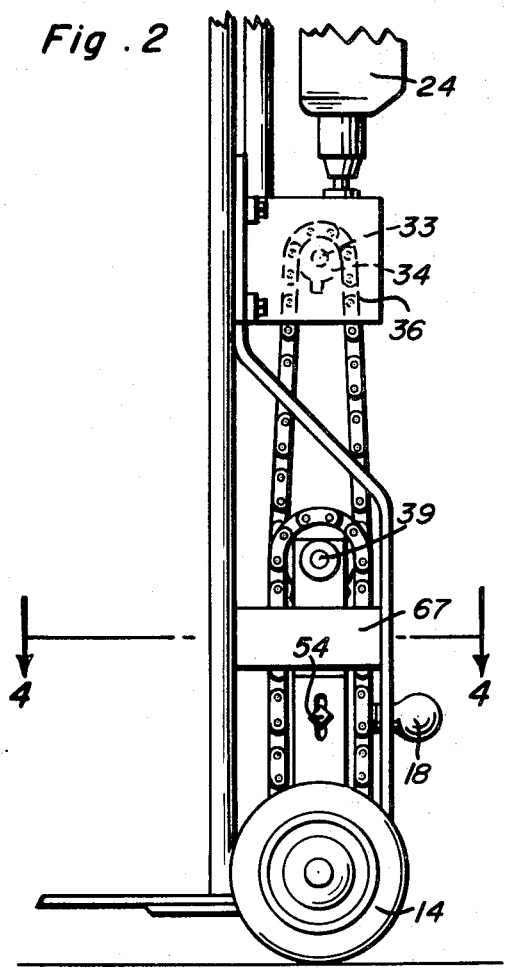
FIG. 2 is a side elevational view of the mechanism illustrated in FIG. 1.
Figure 4:
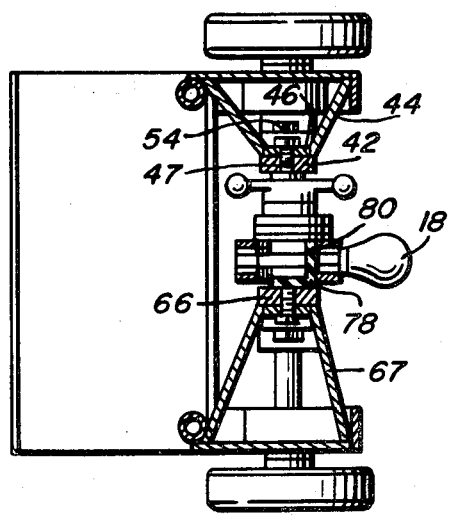
FIG. 4 is a sectional view taken along a plane passing through section line 4—4 in FIG. 2.

The gear box 26 has an output shaft 33 that steps down the speed from the driving electric drill 24. A sprocket wheel 34 is mounted at the outward end of the gear box drive shaft 33. The upper end of an endless drive chain belt 36 engages the sprockets on sprocket wheel 34. The previously mentioned adjustable mounting of the gear box 26 serves to take up belt slack. The chain belt 36 extends vertically downwardly to entrain a second vertically aligned sprocket wheel 38. The sprocket wheel 38 is positioned vertically beneath the sprocket wheel 34. As seen in FIG. 3, the sprocket wheel 38 is mounted to the right end portion of shaft 39 (FIG. 2). A journal element 40 is mounted to the right end of the shaft and aids in securing the sprocket wheel 38 in place. The journal element 40 extends downwardly to an integral plate portion 42 which is positioned in slidable abutting relation with the frame section 44. This adjustment complements the bolt tensioning adjustment. As seen in FIG. 4, the frame section 44 includes a bight element 46 that overlies the plate portion 42. A threaded bore is formed in the plate portion 42 and serves to receive bolt 47. The outer headed end of the bolt is received within a slot (not shown) that is formed in the bight element 46. Accordingly, by loosening bolt 47, the plate portion 42 can be slidably adjusted with respect to the frame section 44. Then, by tightening the bolt 47, the bight element 46 becomes clamped against the plate portion 42 thereby securing the plate portion 42 in position relative to the frame. In order to prevent the plate portion 42 from rotating, a second plate portion 48 is mounted in abutting overlying relation with the plate portion 42. As seen in FIG. 2, a fastener 54 clamps the plate portions 42 and 48 together, the plate portion 48 having a slot therein to allow vertical relative adjustment of the plate portions 42 and 48 for tensioning bolt 36. As FIG. 3 illustrates, the lower end of the plate portion 48 terminates in a journal element 50 that is con-centrically mounted to the wheel axle 52.

The chain belt 36 drives shaft 39 (FIG. 2). A second drive chain belt 70 entrains a sprocket wheel 62 which is positioned in coaxially spaced relation from the previously discussed sprocket wheel 38. Viewing FIG. 3, the sprocket wheel 62 is positioned to the left of the sprocket wheel 38. A journal element 64 identical with element 40 is positioned on the left end of the shaft 39. In a similar manner a plate portion 66 extends downwardly from the journal element 64 and is adjustably positioned in overlying abutting relationship with plate portion 68 that terminates in a journal 69 mounted on axle 52. A sprocket wheel 72 is positioned vertically below the sprocket wheel 62, the chain belt 70 entraining both sprocket wheels 62 and 70. The previously discussed bulbous member 18 is mounted to and extends perpendicularly outwardly from the drive chain belt 70 so that when shaft 39 (FIG. 2) is driven by belt 36, the belt 70 will also be driven. As a result, the bulbous member 18 is conveyed by belt 70 so as to effect the climbing operation previously discussed in connection with FIG. 1.

Figure 6:
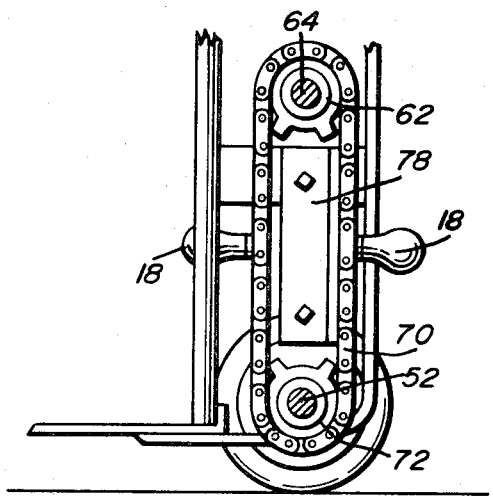
FIG. 6 is a side elevational view illustrating a guide plate which retains the proper shape of a drive belt during lifting.

A conventional friction clutch 74 is mounted to the wheel axle 52 and serves to selectively couple sprocket wheel 72 to the axle 52. Thus, it is an advantage of the present invention to selectively power the wheel axle 52, which is desirable when pushing a heavy load on flat ground. However, it should be understood that the chain belts 36 and 70 can be driven without actuation of clutch 74. In such a case, only movement of the bulbous member 18 is realized. When the clutch 74 is actuated, the bulbous member 18 is still continuously conveyed by chain belt 70. However, there is no interference by the bulbous member 18 to an individual pushing the hand truck along flat ground. Although the invention has been described as including a single bulbous member 18, it should be understood that a plurality of such members can be included as shown in FIG. 6. Further, a handwheel 76 is provided to selectively tighten or actuate the clutch 74. This handwheel may be actuated by an individual's hand or foot.

As will be appreciated by viewing FIG. 1, a great deal of force is brought to bear against the bulbous member 18 as it lifts the hand truck from step to step. This of course causes constriction of the drive belt 70. In an effort to eliminate this constriction, a guide plate 78 is provided within the area entrained by the belt 70. More particularly, the plate 78 is an angle iron as indicated in FIG. 4. Preferably, the guide plate is made from a suitable friction resistant material such as nylon. Accordingly, as the bulbous member 18 begins to lift the hand truck, the section of the chain belt to which the bulbous member is attached is forced inwardly into sliding relation with the guide plate 78 which limits constriction of chain belt 70. As shown in FIG. 4, the guide plate 78 has a flange portion that is suitably attached to the plate portion 66 thereby securing the guide plate to the frame of the hand truck.

Figure 5:
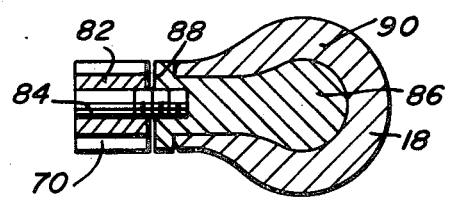
FIG. 5 is a partial sectional view illustrating the structure of a bulbous member which lifts the hand truck of the present invention up a flight of steps.

Referring to FIG. 5, the structure of the bulbous member 18 is shown. Reference numeral 82 indicates a particular link in the chain belt 70. A threaded member 84 extends outwardly from the link and is inserted within the base 88 of the core 86 that has a bulb-like shape. The member 84 is secured to link 82 by suitable means such as welding. The threads at the outer end of the member 84 are received in a threaded bore in the core 86. The outer envelope 90 of the bulbous member 18 is rotationally mounted on the core 86.

By virtue of the rotational connection between the envelope 90 and the core 86 of the bulbous member 18, it is possible for the user of the hand truck to effect lateral rolling of the hand truck on the treads of a step as illustrated in FIG. 1. This is of great assistance to the hand truck user in centering the hand truck on the steps as the hand truck climbs the steps.

A second embodiment of the present invention is illustrated in FIG. 7. Essentially, this embodiment differs from the previously discussed embodiment in two respects. First, rather than employing an electric drill for powering the mechanism, a fixed electric motor 92 is secured to the frame of the hand truck. This motor is employed to drive a single drive chain belt (rather than two belts) to which a bulbous member is attached. Accordingly, the second embodiment offers a simplification in the transmission mechanism although it requires a permanently installed electric motor.

Dealing with the second embodiment in greater detail, a gear box 94 is coupled to the output shaft of the electric motor 92. An output shaft 96 extends from the gear box 94 and is journaled within a journal element 40 identical to that previously described. A second end of shaft 96 is supported by a journal element 64 identical to that previously discussed. A chain belt 98 entrains a first sprocket wheel 100 that functions in the same manner as the previously described sprocket wheel 62 (FIG. 3). A second sprocket wheel 104 is positioned in a manner identical with the previously discussed sprocket wheel 72 (FIG. 3). Accordingly, when FIG. 7 is considered in toto, the drive belt 98 is similarly connected to the remainder of the hand truck mechanism as is the previously described chain belt 70 (FIG. 3). Thus, it will be appreciated that by directly driving the chain belt 98 from a gear box, a second chain belt, such as included in the first embodiment, is eliminated.

It should be noted that although the first mentioned embodiment of FIGS. 1–6 have been described as including two drive chain belts, this embodiment could be simply modified, in view of the aforementioned disclosure regarding the second embodiment, to include only one chain drive belt.

Although the two forms of the present invention have been described as employing electric motors, it is to be understood that other conventional types of prime movers may be used. For example in lieu of an electric motor, an internal combustion engine may be employed. It would be desirable to include a gear shift lever and associated transmission with the engine so as to permit forward or backward motion of the hand truck.

It is to be emphasized that the term "motor means" in the following claims is to be broadly interpreted so as to include an internal combustion engine or other conventional type of prime mover.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A motorized load carrier adapted to climb stairs, the carrier comprising a frame, a transmission mechanism mounted on the frame, motor means for driving the transmission mechanism, and means connected to the transmission mechanism for engaging succeeding steps in a flight of steps to produce powered displacement of the carrier along the flight of steps, the step engaging means including longitudinal means mounted to the transmission mechanism and extending perpendicularly therefrom and parallel to a normal direction of movement of the carrier for rotation about an axis parallel to the normal direction of movement of the carrier for facilitating lateral movement of the carrier on the step.

2. The structure of claim 1, further including a wheel assembly and wherein said transmission mechanism includes an endless belt having the longitudinal means mounted thereto and being connected directly to the wheel assembly, and the transmission mechanism further includes a chain drive for driving the belt.

3. The structure of claim 2 wherein the motor means comprises an electric drill motor coupled to the gear means.

4. The structure of claim 1, further including a wheel assembly, and wherein said transmission mechanism includes an endless belt having the longitudinal means mounted thereto and connected to the wheel assembly, and the motor means comprises an electric motor permanently mounted to the frame.

5. In a step climbing powered hand truck having a driving member and means connected to the member for lifting the hand truck to a succeeding step, the improvement wherein the lifting means has projecting means mounted to the driving member and extending perpendicularly therefrom and parallel to a normal direction of movement of the hand truck for rotation about an axis parallel to the normal direction of movement of the hand truck for permitting lateral movement of the hand truck on a step.

* * * * *